United States Patent [19]

Schnitzler

[11] Patent Number: 5,022,779
[45] Date of Patent: Jun. 11, 1991

[54] BALL JOINT

[75] Inventor: Franz D. Schnitzler, Hilden, Fed. Rep. of Germany

[73] Assignee: TRW Ehrenreich GmbH & Co., KG, Fed. Rep. of Germany

[21] Appl. No.: 593,482

[22] Filed: Oct. 2, 1990

Related U.S. Application Data

[63] Continuation of Ser. No. 373,907, Jun. 29, 1989, abandoned.

[30] Foreign Application Priority Data

Jul. 1, 1988 [DE] Fed. Rep. of Germany .... 8808443.4

[51] Int. Cl.$^5$ .............................................. F16C 11/06
[52] U.S. Cl. ..................................... 403/138; 403/132; 403/144
[58] Field of Search ............... 403/122, 132, 133, 134, 403/135, 138, 119, 127, 136, 144; 29/149.5 B

[56] References Cited

U.S. PATENT DOCUMENTS 4,102,585  7/1978  Herbenar .................. 29/149.5 B X
4,691,422  9/1987  Tilgner et al. ................. 403/122 X

FOREIGN PATENT DOCUMENTS 0020214 12/1980  European Pat. Off. .
0082638  6/1983  European Pat. Off. .
2405160  8/1975  Fed. Rep. of Germany .
2913700 10/1980  Fed. Rep. of Germany .
1125668 11/1956  France .
2449819  9/1980  France .

Primary Examiner—Andrew V. Kundrat
Assistant Examiner—Franco S. De Liguori
Attorney, Agent, or Firm—Tarolli, Sundheim & Covell

[57] ABSTRACT

The invention relates to a ball joint, especially for steering or transmission rods of motor vehicles. The ball joint includes a bearing shell (3) made of plastic which has a lower shell (5) and an upper shell (6) for the support of a ball head (2) in a joint housing (4). The lower shell (5) is turned toward a housing opening (8) for a ball stud (1) and the upper shell (6) is supported through a spring element (11) against a housing cover (9). The lower shell (5) is connected elastically with the outer rim of the upper shell (6). To produce a technically improved ball joint of which the mounting is facilitated, of which the lower shell (5) and the upper shell (6) are secured from rotation in relation to each other, and of which has better operational properties, it is proposed that the lower shell (5) and the upper shell (6) be joined in one piece by at least one connection stop (12).

5 Claims, 4 Drawing Sheets

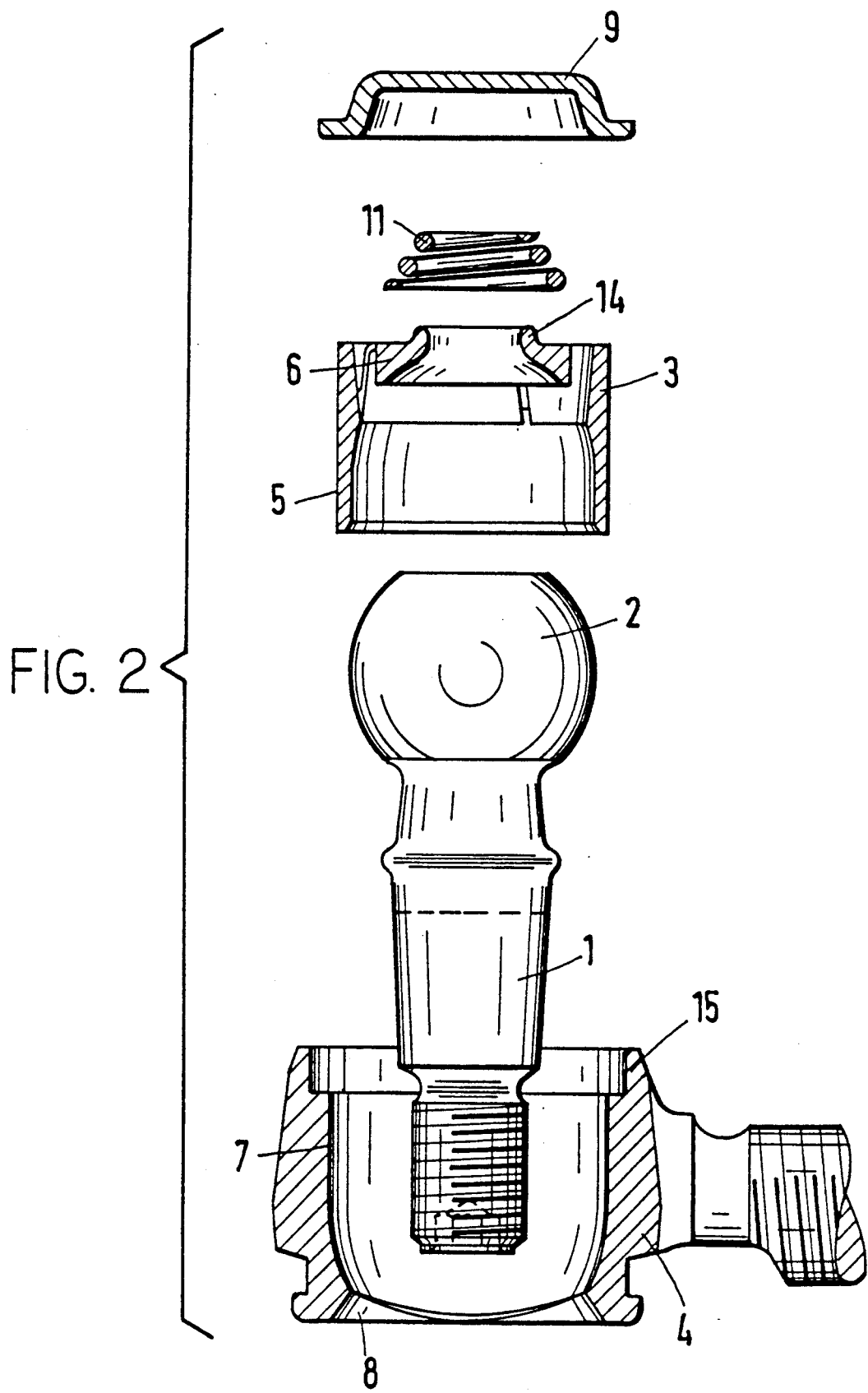

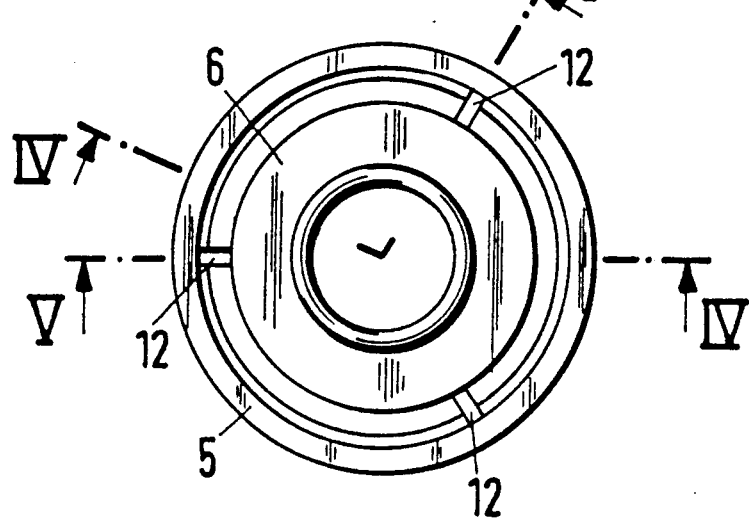
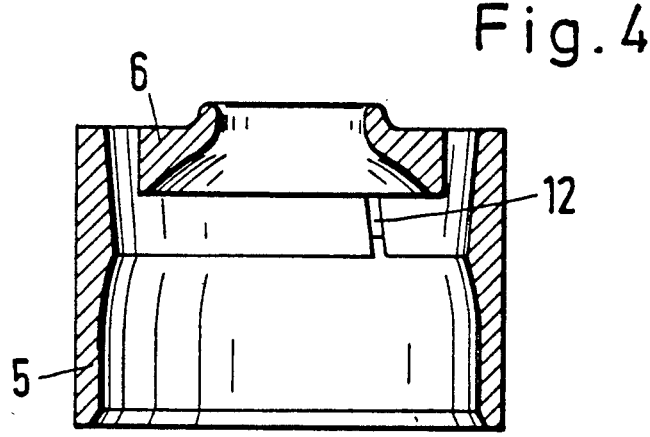
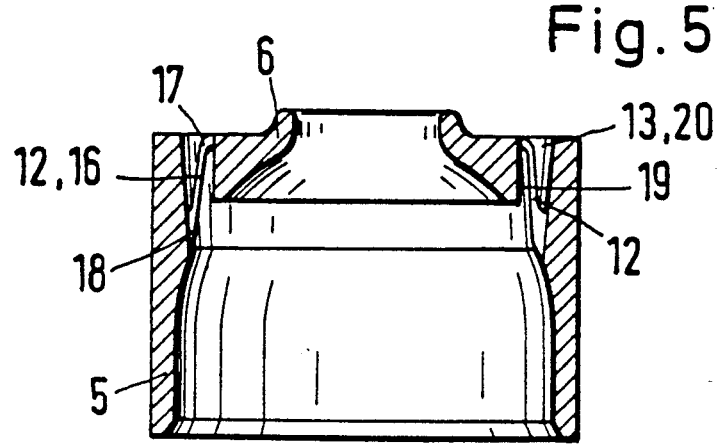

BALL JOINT

This is a continuation of co-pending application Ser. NO. 07/373,907 filed on June 29, 1989 now abandoned.

BACKGROUND OF THE INVENTION

1. Technical Field

The invention relates to a ball joint, especially for steering and transmission rods of motor vehicles. The ball joint includes a bearing shell made of plastic which has a lower shell and an upper shell for the support of a ball head in a joint housing. The lower shell is turned toward a housing opening for a ball stud, and the upper shell is supported against a housing cover through a spring element. The lower shell is joined elastically with the outer rim of the upper shell.

2. Background Art

From German Disclosure 2,405,160 is known a ball joint of this kind. The ball joint includes a lower shell and an upper shell which are joined and sealed together by a circumferential elastic joining. The elastic joining includes a sealing lip of the upper shell made of elastic material. The sealing lip sealingly engages in a ring groove on the upper rim of the lower shell. For this purpose, the sealing lip is inserted in the ring groove under the pressure of a closing cover.

The mounting of this previously known ball joint is expensive because the upper shell and lower shell must be assembled, and are only secured after rolling in the closing cover. Also, the upper shell made of an elastomer material has poor friction, wear and fatigue properties. This may lead to a change of its prestress and the operation characteristics of the ball joint.

In German Disclosure 2,913,700 is disclosed a ball joint having a lower shell and an upper shell. The upper shell is supported by a spring against a housing cover. On the upper shell are formed axially directed flanges which engage form-fitting in corresponding openings of the lower shell. However, the form-fitting connection between the lower shell and the upper shell exists only with the ball joint assembled, and must be produced in the mounting.

SUMMARY OF THE INVENTION

Starting from this, the invention addresses the problem of providing a technically improved ball joint of which the mounting is facilitated, of which the lower and upper shells are secured against a mutual rotation, and of which has better operational properties.

For the technical solution of this problem, the invention is characterized by a one-piece bearing shell comprising lower and upper shell portions joined into one part by at least one elastic connection stop.

The provision of lower and upper shell portions as a one-piece bearing shell has the advantage that these need not be first assembled and fixed in the installation position in the mounting of the ball joint. At the same time, the form-elastic connection stop make possible a relative axial movement between the lower and upper shells. This makes possible a prestressing of the upper shell and the ball head through the spring element supported against the cover of the housing. Here, the bearing shell material may be chosen with outstanding friction, wear and fatigue properties because the prestressing of the ball head is mainly set through the spring element. With a form-elastic, especially a thin-walled design of the connection stops, relatively inelastic bearing shell materials may also be used.

In one embodiment of the invention, connection stops which are displaced and separated by gaps are provided around the vertical axis of the stud through which the form elasticity of the joining of the upper and lower shells is increased. In one advantageous embodiment, three connection stops which are displaced by 120° around the axis of the stud are provided. The three connection stops set back the upper shell even after a tilting in relation to the lower shell.

In another embodiment, each connection stop forms between the lower shell and the upper shell, at least one groove extending in the axial direction of the stud. Here, each connection stop is guided in at least a middle section and in the axial direction of the stud so that it can be bent out perpendicularly to the axis of the stud. Also, each connection stop is guided in the side section perpendicular to the axial direction of the stud so that it can be bent out in the axial direction of the stud. In this way, the relative mobility of the upper shell to the lower shell is increased in the axial direction of the stud. Each groove may be limited by one middle section and one side section of the connection stop and the upper shell and the lower shell, respectively.

The axial directing of the grooves makes possible also the production of the bearing shells by a relatively simple injection tool, and a better deformability of the bearing shells after injection. The deformability of the bearing shell is still further improved if each groove has a width increasing toward the opening of the groove.

In another embodiment, each connection stop has at least one fold so that the connection between the lower and upper shells is designed in the manner of a folded bellows. In this way, the form elasticity of the connection stop is still further increased. Preferably, the folded connection stop forms at least one groove extending in the axial direction of the stud and between the middle section and a side section joining the latter.

Finally, in one embodiment of the invention, it is provided that the bearing shell includes a duromer material, especially polyamide (PA) from which excellent friction properties with adequate form elasticity are obtained.

BRIEF DESCRIPTION OF THE DRAWINGS

Other details and advantages of the subject of the invention are provided from the description which follows, of the respective drawings, in which is shown one preferred form of execution of a ball joint according to the invention.

FIG. 2 shows the ball joint of FIG. 1, cut lengthwise and in exploded view;

FIG. 3 shows a bearing shell of the ball joint of FIG. 1, in top view;

FIG. 4 shows the bearing shell, cut along the line IV—IV of FIG. 3;

FIG. 5 shows the bearing shell, cut along the line V—V of FIG. 3; and

DESCRIPTION OF A PREFERRED EMBODIMENT

Figure 1:
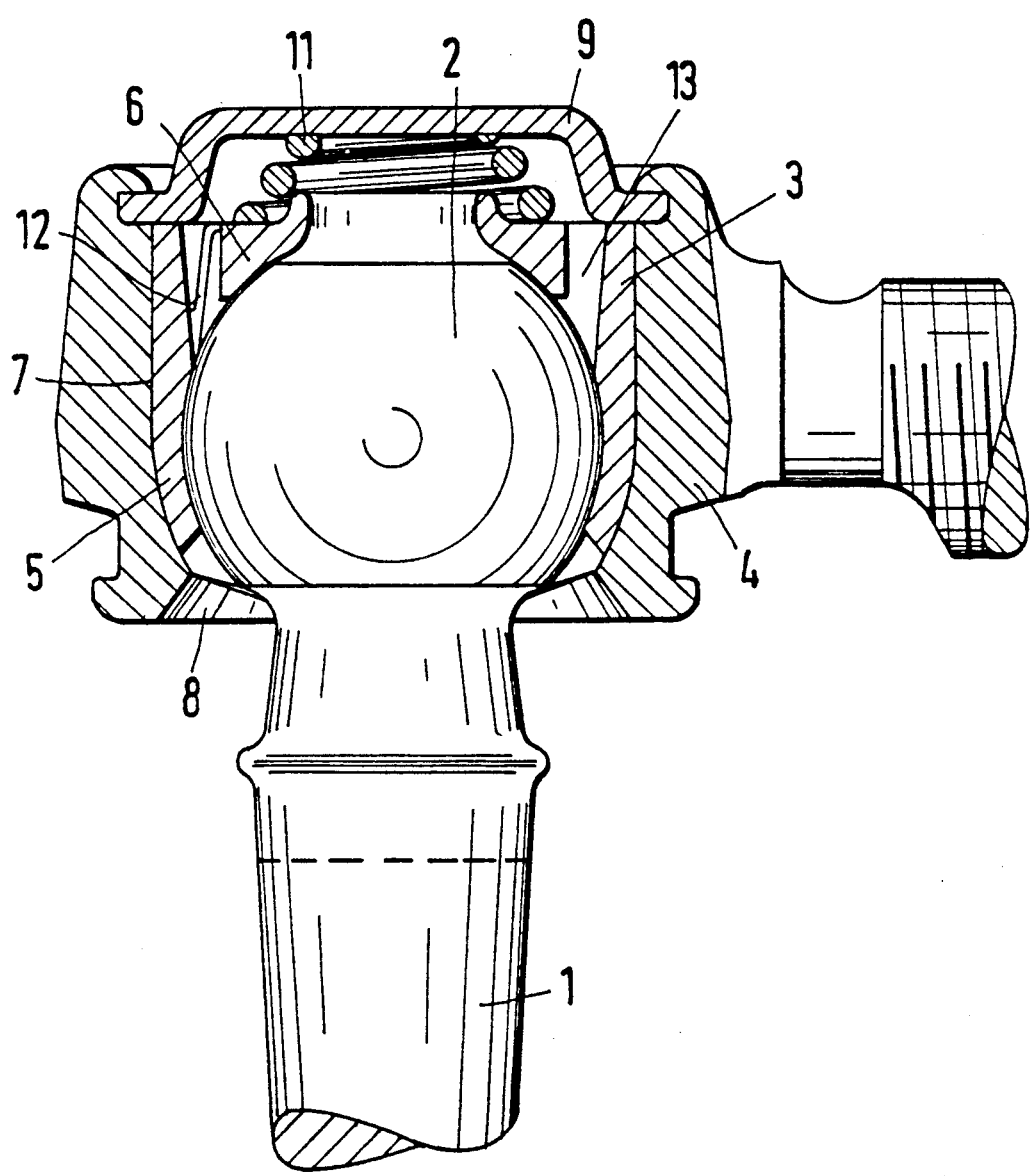
FIG. 1 shows an assembled ball joint of the present invention in longitudinal section.

As shown in FIG. 1, a ball joint has a ball stud 1 of which a ball head 2 is held rotatable and pivotable in a joint housing 4 by a one-piece bearing shell 3. The bearing shell 3 has a lower shell 5 and an upper shell 6 which form together a partially spherical surface supporting the ball head 2 on both sides of the equator.

The lower shell 5 is set into a mainly cylindrical housing bore 7 and is axially supported near a housing opening 8 for the ball stud 1 and in a slightly tapered section of the housing bore 7. At the other end, the lower shell 5 is axially supported by a housing cover 9 rolled into the joint housing 4.

The upper shell is supported through a conical spiral spring 11 against the housing cover 9. The prestress of the spiral spring 11 determines the pressing pressure of the upper shell on the ball head 2, and determines the operation characteristics of the ball joint. The mobility of the upper shell 6 in relation to the lower shell 5 is assured by three connection stops 12 located between the lower shell 5 and the upper shell 6 and displaced by 120° around the vertical axis of the stud. The connection stops 12 are completely placed in an inset opening 13 of the lower shell 5 for the upper shell 6.

As can be seen better from FIG. 2 in the assembly of the ball joint, first the ball stud 1 is set by its ball head 2 into the bearing shell 3. With this, the joint housing 4 by the tapered housing bore 7 exerts a radial force on the lower shell 5 so that the latter near the housing opening 8 presses closely against the ball head 2. Then the conical spiral spring 11 is set onto the upper shell 6 on which it is centered by a centering rim 14. Finally, the housing 9 is set on and fastened in the joint housing 4 by the rolling in of a rolled rim 15.

Figure 6:
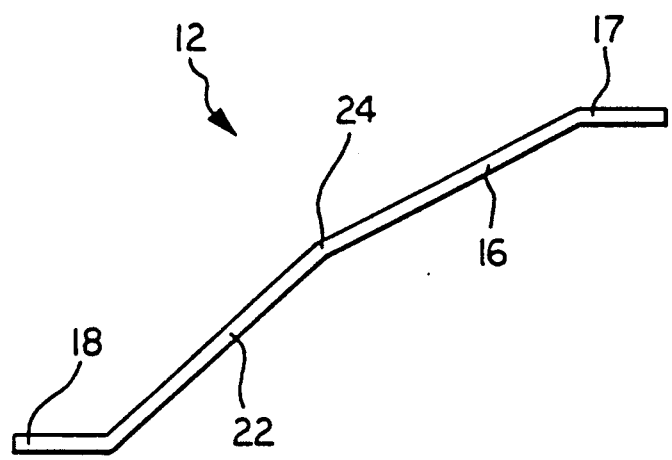
FIG. 6 shows a connection stop having a fold.

The arrangement and design of the connection stops 12 can be better explained from FIGS. 3 to 5. The connection stops 12 are arranged at three points displaced by 120° around the axis of the stud. Since they are thin-walled and slender, their form elasticity is great. The connection stops 12 extend only into the inset opening 13. They have a middle section 16 running mainly in the axial direction of the stud. This makes possible, in particular, a centering of the upper shell 6 in the lower shell 5. They have also side sections 17, 18 running mainly perpendicular to the axial direction of the stud. This favors a movement of the upper shell 6 in relation to the lower shell 5 in the axial direction of the stud. Referring to FIG. 6, if another middle section 22 adjoins at least one of the side sections 17, 18, the connection stops have a fold 24, and as a folding bellows, have an especially high elasticity of form.

Each connection stop 12 defines two grooves 19, 20 extending in the axial direction of the stud. The two grooves 19, 20 are limited by the middle section 16, the side section 17 or the side section 18, and the upper shell 6 or the lower shell 5. The grooves 19, 20 widen toward their groove openings and favor the production of the bearing shell 3 in an injection molding process.

Having described a preferred embodiment of the invention, the following is claimed:

1. A ball joint comprising:

a joint housing including a housing cover defining a chamber and having an opening extending into said chamber;

a ball stud including a ball head disposed in said chamber and a joint stud extending through said opening, said ball stud being rotatable and pivotable in said joint housing;

a plastic one-piece bearing shell in said chamber including a lower shell portion facing toward said opening in said joint housing and an upper shell portion having an outer rim, said upper and lower shell portions having bearing surfaces engaging said ball head;

a spring element disposed between said housing cover and said upper shell portion urging said upper shell portion against said ball head; and at least ne form-elastic connection stop integral with and spacing said lower shell portion and said outer rim of said upper shell portion and lower shell portion, said at least one connection stop, and said upper shell portion defining said piece bearing shell before and after location thereof in the chamber of said joint housing, said at least one form-elastic connection stop permitting relative axial movement of said upper and lower shell portions.

2. In a ball joint of the kind including a joint housing having an opening, a ball stud defining a longitudinal axis and including a ball head supported in said housing, and a spring element biased against a housing cover, the improvement comprising:

a plastic one-piece bearing shell comprising a lower bearing shell portion facing toward said housing opening and an upper bearing shell portion supporting said ball head in said joint housing, said upper shell portion having an outer rim and being supported through said spring element against said housing cover, three form-elastic connection stops integral with and spacing said lower and upper bearing shell portions to define said plastic one-piece bearing shell before and after assembly of said ball joint, said connection stops being displaced 120 degrees around said ball stud axis and providing an elastic connection of said lower shell portion with said outer rim of said upper shell portion, each of said connection stops forming between the lower and upper shell portions at least one groove having an opening extending in said longitudinal axis of said ball stud.

3. A ball joint according to claim 2, with the distinction that said at least one groove (19, 20) has a groove width increasing toward said opening.

4. A ball joint according to claim 2 with the distinction that each of said connection stops (12) has at least one fold.

5. A ball joint according to claim 2 with the distinction that said bearing shell (3) includes a duromer material, especially of polyamide (PA).

* * * * *

UNITED STATES PATENT AND TRADEMARK OFFICE
CERTIFICATE OF CORRECTION

PATENT NO. : 5,022,779
DATED : June 11, 1991
INVENTOR(S) : Franz D. Schnitzler

It is certified that error appears in the above-identified patent and that said Letters Patent is hereby corrected as shown below:

Column 4, Line 17, Claim 1, delete "ne" and insert --one--.

Column 4, Line 21, Claim 1, after "said" insert --one---.

Signed and Sealed this

Eighth Day of December, 1992

Attest:

DOUGLAS B. COMER

*Attesting Officer*   Acting Commissioner of Patents and Trademarks